Patented Nov. 25, 1952

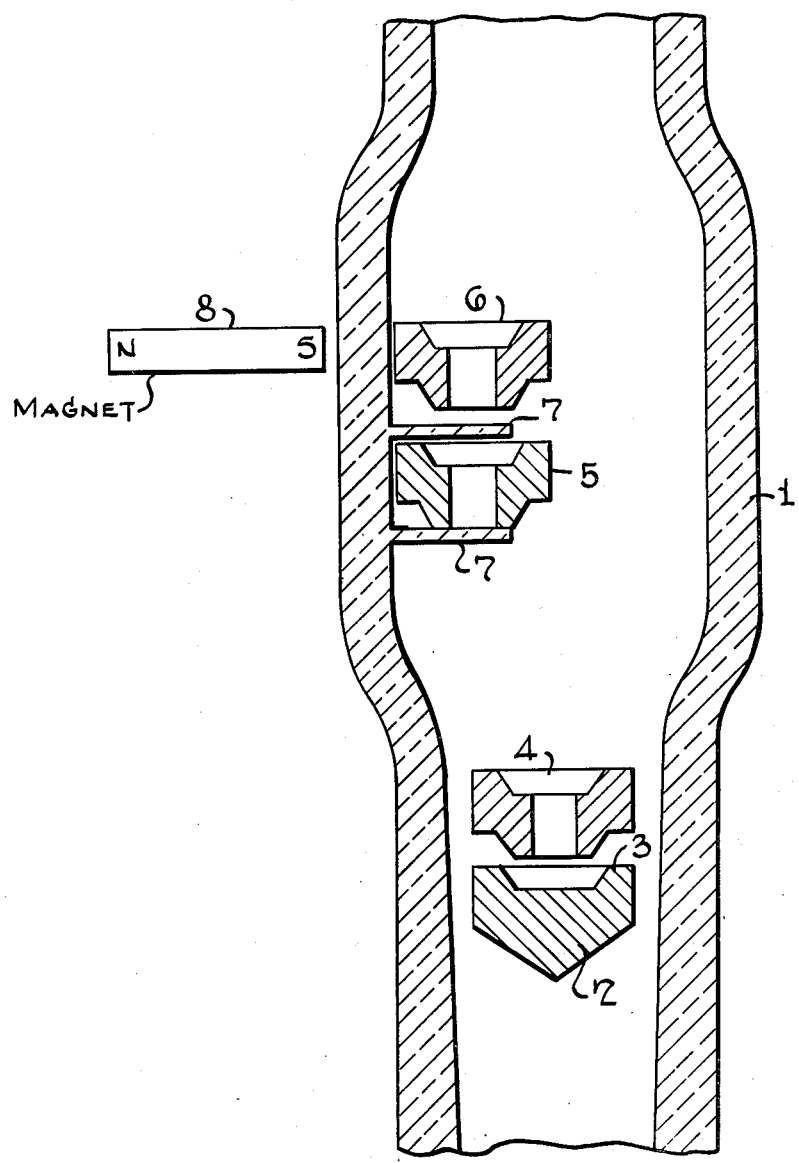

2,618,974

UNITED STATES PATENT OFFICE 2,618,974

FLUID FLOW GAUGE

George R. Gilbert, Elizabeth, N. J., assignor to Standard Oil Development Company, a corporation of Delaware Application March 1, 1951, Serial No. 213,330

4 Claims. (Cl. 73—209)

This invention concerns a novel form of fluid flow gauge of the nature generally identified as a Rotameter. The gauge of this invention employs a tapered non-magnetic float in a cylindrical gauge tube according to the conventional practice. In accordance with this invention, provision is made for adding or taking away magnetic weights from the non-magnetic float, to increase or decrease the weight of the float and to increase or decrease the range of the gauge.

A convenient form of fluid flow gauge now widely used is the type of gauge in which flow is measured by the displacement of a float in a vertical flow conduit. The float is so shaped with respect to the conduit that the vertical position of the float is a function of the fluid flow through the conduit. While the float employed may be made in a variety of shapes, a common and operative form is to employ a cylindrical float terminating in a cone shaped lower extension. The cylindrical float has a cross-sectional area somewhat less than the conduit in which it is positioned so that fluid may pass around the float in the conduit. Preferably, the float is fluted to impart a rotary motion to the float as fluid flows past it. The conduit in which the float is positioned is generally composed of a transparent material such as glass or plastic which may be marked so that direct reading of flow rates may be made by noting the position of the float.

In this type of flow gauge only a limited range of flow rates can ordinarily be measured. For example, of the gauges of this type presently available, only about a ten fold change in flow may be determined with a given gauge. It is clearly desirable for many applications to be able to extend the usable range of the gauge as desired.

In accordance with this invention this objective is provided by employing magnetic weights which may conveniently be added to or removed from the non-magnetic float by operation of a magnet outside the gauge conduit. While other materials may be employed, it is particularly contemplated that the magnetic weights be composed of a ferrous metal. The weights may be shaped in any desired form of a nature to maintain a fixed position with respect to the non-magnetic float once the weight has been placed on the float. The virtue of employing magnetic weights of this character is that the weights may be readily placed on the non-magnetic float by manually or automatically moving a magnet external to the conduit.

A preferred embodiment of this invention is illustrated in the accompanying drawing showing in cross-sectional elevational view a float constructed in accordance with this invention. In the drawing the numeral I designates the gauge tube in which the float is employed. As indicated, the gauge tube is usually constructed of glass or transparent plastic so that flow calibrations may be made directly on the tube to permit visual determination of flow rates. However, if desired, the gauge tube may be constructed of non-transparent material such as a metallic tube, employing electrical means or other techniques to determine the position of the float within the tube. However, for the purpose of this invention, it is necessary that the gauge tube be constructed of non-magnetic material. It is to be understood that the gauge tube I illustrated is made a part of any flow line through which it is desired to determine the rate of flow of fluid. As illustrated, the metering portion of the gauge tube is downwardly tapered so that the vertical position of the float will be a function of flow rate.

A non-magnetic float 2 is positioned within the gauge tube. Float 2 may be constructed of glass, aluminum, brass, stainless steel, or any other non-magnetic material. The float is preferably constructed to have the downwardly extending conical termination illustrated and is built to have a circular cross-sectional diameter somewhat less than the gauge tube I, in which the float is positioned. The upper portion of the float may be constructed to provide the peripheral ring 3 as shown, or as will be understood, the top surface of the float may be shaped in other forms. The purpose of the peripheral ring 3 or its equivalent is to provide a seat or positioning element for the magnetic weights to be added to the non-magnetic float 2.

Suitable magnetic weights are identified by the numerals 4, 5 and 6. The magnetic weights 4, 5 and 6 are constructed of iron or any other material which is attracted by a magnet. Each of the weights is shaped to have a downwardly terminating portion adapted to seat in the upper termination of the non-magnetic float 2. The upper termination of each of the weights is constructed similar to the upper termination of the non-magnetic float, permitting stacking of any desired number of weights on the non-magnetic float. The gauge tube I is built to have an enlarged cross-sectional area at a portion of the gauge tube above the height employed for flow determinations. In this enlarged portion of the gauge tube provision is made for the retention of any desired number of the magnetic weighting elements. A suitable means for accomplishing this as illustrated is to position horizontally extending trays 7 from one side of the enlarged portion of the conduit above the gauge tube. These trays are adapted to support the magnetic weights 5 and 6 when these weights are placed on the trays. However, sufficient clearance is provided in this enlarged portion of the gauge tube to permit passage of the magnetic weights past the trays when the weights are moved to the opposite side of the conduit. This may be simply and effectively accomplished by employing a permanent magnet 8. For example, to add the weight 6 to the magnetic float 2, a permanent magnet 8 may be placed in the position shown in the drawing and then moved circumferentially around the gauge tube to pull the magnetic weight 6 off the tray or shelf 7. By then moving the magnet 8 downwardly towards the float 2, the weight 6 will be carried downwardly to seat on the non-magnetic float. By this means the range of the gauge may be readily extended. Similarly, if flow rates are so low as to ineffectually move the float 2 carrying one or more magnetic weights, it is possible to remove the magnetic weights to effectively decrease the range of flow rates determined by the gauge. To remove weights, the reverse procedure to that described will be employed.

It is apparent that the general apparatus described is subject to many modifications. For example, while the weights 4, 5 and 6 have been described as being constructed of magnetic material, if desired, these weights may be plated, for example, with chromium or zinc, so as to protect the weights against corrosive fluids. Again, it is possible to fabricate suitable magnetic weights by sealing a ferrous metal in a glass weight. Both the non-magnetic float and the magnetic weights may be shaped in any desired forms provided they are adapted to mate to prevent transverse displacement with each other once the weights are positioned on the magnetic float.

What is claimed is:

1. A flow measuring apparatus employing a vertical non-magnetic gauge tube, a float positioned in said gauge tube having a cross-sectional area smaller than the inside of the gauge tube, said float consisting of non-magnetic material, and a magnetic weight positioned in said gauge tube above said float, said magnetic weight and said float being shaped to provide mating surfaces, whereby said magnetic weight may be placed on or removed from said float by operation of an external magnet.

2. The apparatus defined by claim 1 in which the said gauge tube is provided with an enlarged cross-sectional area at a point of the tube above the portion used for flow determinations providing space to retain said magnetic weight free of contact with said float.

3. The apparatus defined by claim 2 in which the said enlarged portion of the gauge tube is provided with a supporting element on which the said magnetic weight may be positioned.

4. The apparatus defined by claim 3 in which said supporting element comprises a tray extending horizontally part way across the enlarged portion of the gauge tube.

GEORGE R. GILBERT.

REFERENCES CITED

The following references are of record in the file of this patent:

UNITED STATES PATENTS

| Number | Name | Date |
| --- | --- | --- |
| 2,252,883 | Everson | Aug. 19, 1941 |
| 2,260,516 | Gerber | Oct. 28, 1941 |
| 2,350,343 | Fischer | June 6, 1944 |
| 2,458,637 | Pratt et al. | Jan. 11, 1949 |